P. UMHOLTZ & A. UMHOLTZ.

Grate-Bars.

No. 5,214. Reissued Dec. 31, 1872.

Witnesses.

F. Huckel

Alex. M. Stout, Jr.

Inventor.

P. Umholtz, A. Umholtz by A. M. Stout, Atty.

AM. PHOTO-LITHOGRAPHIC CO. N.Y. (OSBORNE'S PROCESS.)

UNITED STATES PATENT OFFICE.

PHILIP UMHOLTZ AND AUGUSTUS UMHOLTZ, OF TREMONT, PA.

IMPROVEMENT IN GRATE-BARS.

Specification forming part of Letters Patent No. 131,641, dated September 24, 1872; reissue No. 5,214, dated December 31, 1872.

*To all whom it may concern:*

Be it known that we, PHILIP UMHOLTZ and AUGUSTUS UMHOLTZ, of Tremont, in the county of Schuylkill, in the State of Pennsylvania, have invented certain Improvements in Grate-Bars, of which the following is a specification:

The first part of our invention relates to the construction of a flat-topped longitudinal or bearing bar in combination with cross-bars arranged and fastened diagonally across such bearing-bar and projecting, say, one inch above the same. By making the top of the bearing-bar flat or level, ashes lodge and are held upon it, and they protect the bar, to a considerable extent, from the heat from the burning fuel, and render it, therefore, more durable; and by arranging the cross or fire-bars diagonally across the bearing-bar the scraper, when used to remove the ashes, is prevented from catching between them, as well as from removing the ashes which lodge in the longitudinal grooves which are made in their top surfaces, as hereinafter described; and, by extending the upper surfaces of the fire-bars above the bearing-bar, space is furnished for the circulation of air between the top side of the bearing-bar and the burning fuel resting on the fire-bars, and thus the bearing-bar is further protected from overheating and burning. The second part of our invention relates, in combination with such bearing-bar and the fire-bars arranged diagonally across the same, to the making of such fire-bars with longitudinal grooves in their top surfaces to hold the ashes, to protect them from injury and burning resulting from the intense heat of the burning fuel; and the making of such fire-bars with each of their ends free from other parts, to the end that when they expand or contract in heating and cooling they shall not crack or break themselves or other parts adjacent to them. The third part of our invention relates to the construction of the fire-bars with longitudinal grooves in their top surfaces and raised, with their top surfaces, an inch (more or less) higher than the bearing-bar, in combination with the latter-named bar, constructed as before described.

Figure 1:
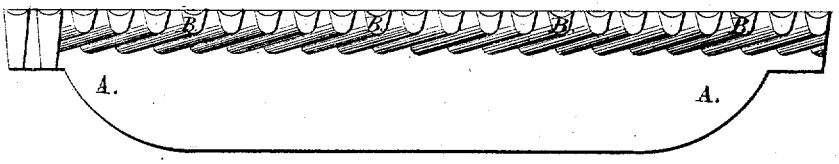
Figure 2:
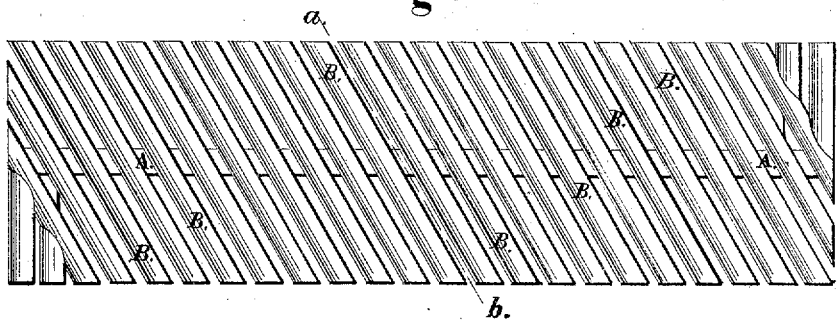

In the accompanying drawing, Figure 1 represents a side view of a grate-bar embracing our improvements; Fig. 2 represents a top or plan view of the same; and Fig. 3 represents a perspective view of a cross-section of the same taken as indicated by the broken line *a b* in Fig. 1.

Figure 3:
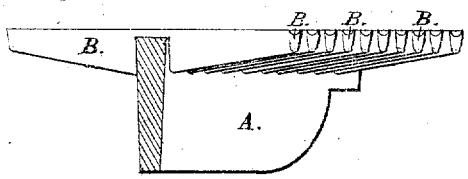

It will appear from Fig. 3 that the fire-bars B increase in depth from their extremities toward their centers, which form affords them greater strength. They may be cast in the same piece with the bearing-bar A or otherwise. In the same figure is shown how the fire-bars B extend above the bearing-bar; and in Figs. 1 and 2 is shown how they are arranged across that bar diagonally, and how their top surfaces are grooved, and how their extremities are left free, as before mentioned. The bars B at each end of the carrying-bar A are made to extend to as great a depth as that of the shoulders of that carrying-bar A, as shown to the left in Fig. 1. The outer ends of the last two inclined bars B, at each end of the grate-bar, are cut off, and the angular space left at the side of the inner end of the last inclined bar B is filled up with two short bars at right angles with the carrying-bar.

We are aware that in the patent of Thomas S. Davis, dated 22d day of February, 1870, for "improvement in grate-bars for furnaces," are shown fire-bars arranged perpendicularly across a bearing-bar having a V-shaped top surface and extending above that bar, and having their ends free; and that in the patent of John Vandecar, dated August 11, 1868, for a fire-grate, is shown a grate-bar composed of cross or fire bars diagonally arranged and with longitudinal grooves in their top sides, but with their ends attached to adjoining long bars and their top edges flush with the bearing-bars; and that in the patent of Hawley Adams, dated April 2, 1867, for "grates for furnaces," is shown a grate-bar composed of a plate of metal with openings arranged diagonally with respect to the sides of the plate, made at regular intervals, so as to result in the formation of flat diagonal bars, fast, of course, at each end and flat on their tops; and, therefore, we do not claim any of these constructions; but What we do claim as our invention is—

1. The combination of the longitudinal bearing-bar A and the cross-bars B, whether grooved or flat-topped, arranged diagonally across said bar A and projecting above the same, substantially as shown and described.

2. The combination of the cross-bars B with longitudinal grooves in their top sides and having their ends free and the longitudinal bearing-bar A, substantially as shown and described, for the purposes set forth.

3. The combination of the cross-bars B having longitudinal grooves in their top surfaces and projecting above the bearing-bar A with that bearing-bar, substantially in the manner and for the purposes shown and described.

PHILIP UMHOLTZ.
AUGUSTUS UMHOLTZ.

Witnesses:
J. P. BECHTEL,
JOHN BECHTEL.